May 15, 1945.  C. L. MARNER  2,376,263
PRESSURE STORAGE TANK
Filed March 19, 1943   2 Sheets-Sheet 1
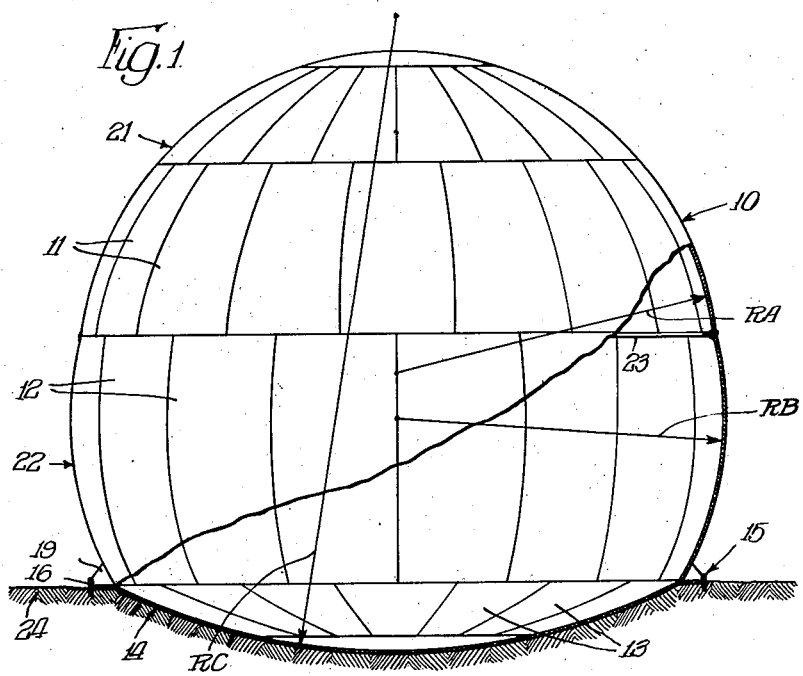
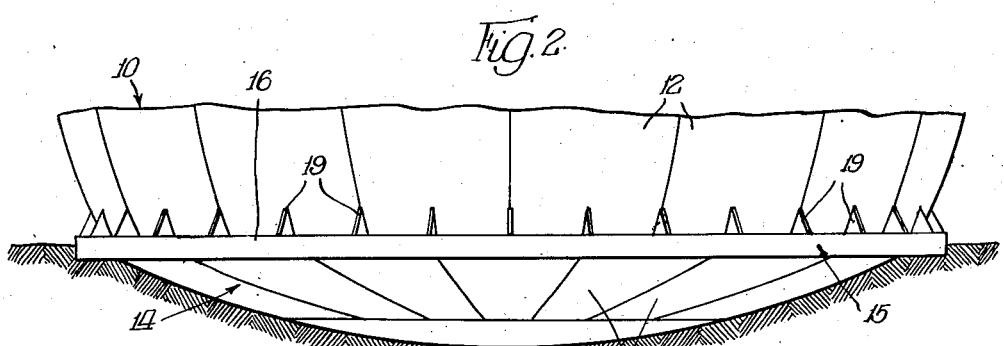
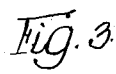
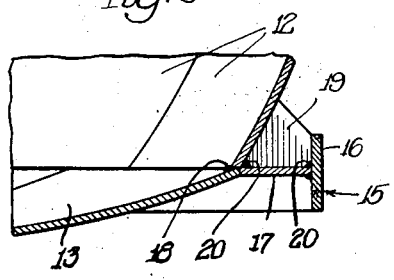
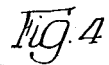
INVENTOR.
Charles L. Marner,
BY

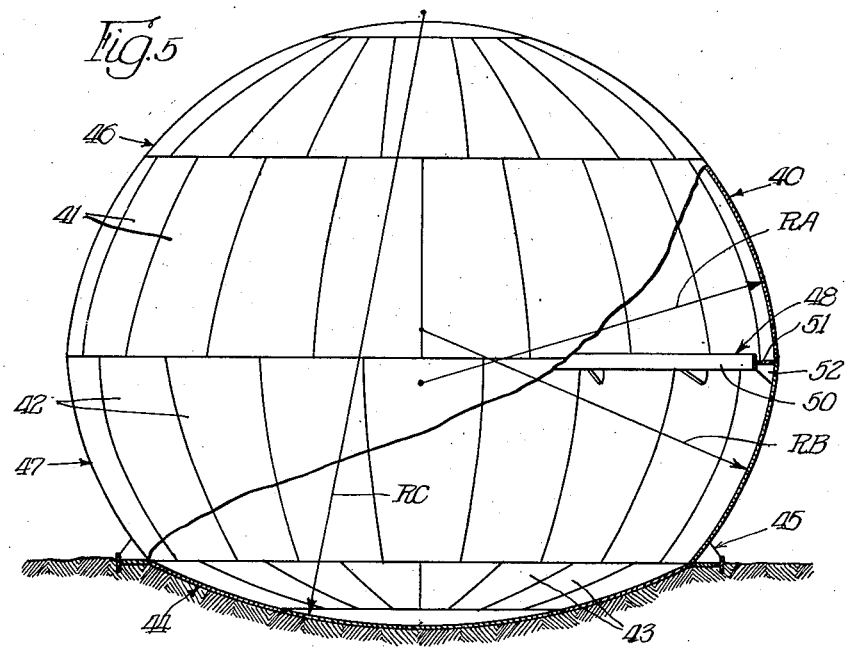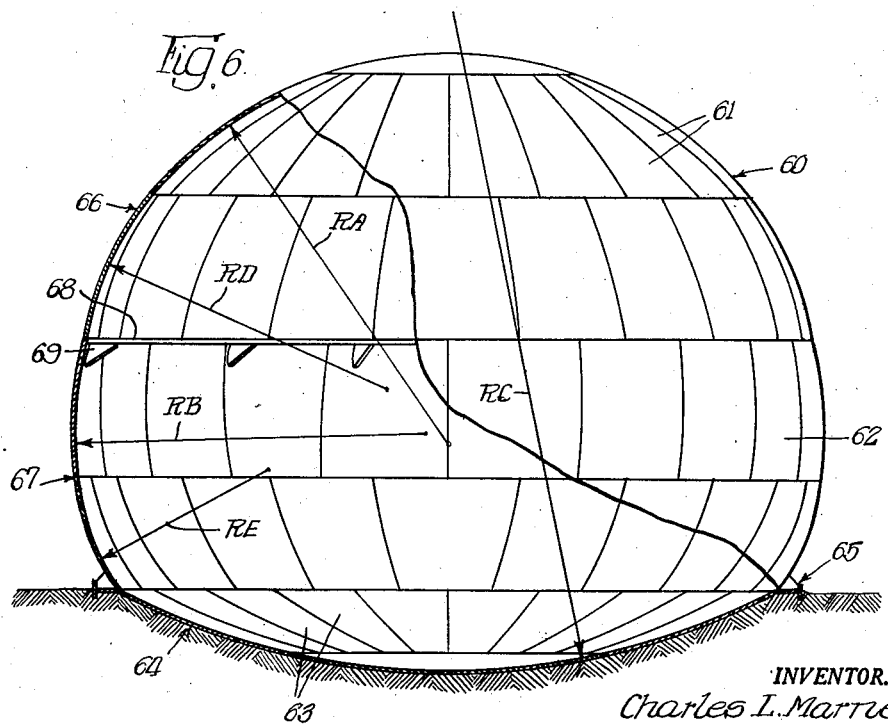

Patented May 15, 1945

2,376,263

UNITED STATES PATENT OFFICE 2,376,263

PRESSURE STORAGE TANK

Charles L. Marner, East Chicago, Ind., assignor to Graver Tank & Mfg. Co., Inc., East Chicago, Ind., a corporation of Delaware Application March 19, 1943, Serial No. 479,678

3 Claims. (Cl. 220—18)

The invention relates to improvements in storage tanks and has reference more particularly to closed storage tanks for storing volatile liquids under pressure to thereby prevent the escape of vapors from said liquids.

An object of the invention is to provide a storage tank for holding liquids under pressure.

Another object of the invention is to provide a container for volatile liquids having an approximately spherical contour with adequate reinforcing for strengthening the tank against bursting or collapsing pressures induced by the vapors or air in the tank.

Another object is to provide a pressure storage tank having two or more spherical sections forming the upper portion of the tank and a dished member forming the bottom with adjacent sections being joined to each other in substantially horizontal planes and wherein each spherical section has a different radius of curvature.

A further object is to provide an approximately spherical storage tank having sections of different radii superposed to form the portion of the tank above ground level with reinforcing means strengthening the joint between adjacent sections to resist bursting and collapsing pressures.

With these and various other objects in view, the invention may consist of certain novel features of construction and operation, as will be more fully described and particularly pointed out in the specification, drawings and claims appended hereto.

In the drawings which illustrate an embodiment of the invention and wherein like reference characters are used to designate like parts—

Figure 1 is a vertical sectional view of a pressure tank constructed in accordance with the present invention;

Figure 2 is an enlarged elevational view of the bottom portion of the tank of Figure 1 showing the exterior girder construction at the ground level;

Figure 3 is a fragmentary sectional view more particularly showing the girder construction;

Figure 4 is a fragmentary sectional view showing the interior girder for strengthening the tank;

Figure 5 is an elevational view with parts shown in section to more clearly illustrate a modification coming within the invention; and Figure 6 is another elevational view with parts shown in section to illustrate a further modification of pressure tank coming within the invention.

Referring to the drawings, the pressure tanks disclosed essentially consist of a plurality of curved plates welded to each other to form a closed container. The container may be described as including two or more spherical sections comprising the portion of the tank above the ground level and which is provided with a dished bottom member having location below ground level. Each tank is a solid of a revolution about a vertical axis. One of the outstanding advantages of the present shape is to secure maximum capacity in relation to height and to also secure a closed tank which will adequately withstand internal vapor pressures such as are encountered in the storing of gasoline and other volatile liquids.

In Figure 1 a closed pressure tank 10 is illustrated, approximately spherical in shape and comprising a plurality of curved plates 11 and 12, curved in both a longitudinal and transverse direction. The plates 11 and 12 are suitably welded to each other to form the portion of the tank above the ground level. Similar metal plates 13 of proper curvature are assembled to form the bottom portion 14 of the tank which is located below ground level. A circular girder, indicated in its entirety by numeral 15, is located at the junction of the bottom portion 14 with the tank and which girder functions to strengthen the tank at said junction so that the same will effectively resist bursting and collapsing tendencies resulting from the load of the liquid in the tank and the vapor pressure above said liquid which at times may be less than atmospheric.

The girder consists of a ring or circular member formed by the metal strip 16 and a substantially horizontal ring member formed by the metal plate 17 having a welded connection with strip 16 and with the tank at the junction of the bottom therewith. The curved plates 12 of the lower section of the tank are suitably secured to the plates 13 forming the bottom portion by the welding 18, best shown in Figure 3. At intervals around the circumference of the girder 14 there is provided brackets or gusset plates 19 which function to join the girder to the tank. The gusset plates can be located at the joint between the bottom curved plates 12 or said gusset plates may be located substantially centrally of the same. Also referring to Figure 3, it will be seen that each gusset plate is suitably welded to the girder by the welds 20.

The tank above the ground level consists of two spherical sections, a top section indicated by numeral 21 and a bottom section indicated by numeral 22. The top section has the contour of a perfect sphere. In other words, the plates 11, forming the top section, are curved in a longitudinal direction to form a semi-spherical portion for this upper part of the tank. Said section 21 has a radius of curvature indicated by RA. The lower plates 12 of the tank are curved in a longitudinal direction to form a bottom section 22 for the present tank which is spherical, having a radius of curvature indicated by RB and which radius is larger than RA. The radius RA intersects radius RB at the junction of the curved plates 11 with the plates 12 and at this junction the tank has an exterior angle of less than one hundred and eighty degrees. To adequately strengthen this junction between the upper and lower sections 21 and 22, comprising the portion of the tank above ground level, the same is provided with an interior girder 23. Said girder is formed by a flat ring, being suitably welded around its periphery to the curved plates 12 which are also welded to plates 11.

The bottom of the tank, as shown in Figures 1 to 3 inclusive, comprises the dished member 13 which has a radius of curvature indicated by RC. In accordance with the invention, the radius RC is proportioned so as to provide the tank with a relatively large bottom. It is preferred that the dished bottom have a diameter smaller than twice RB which is the diameter of the lower spherical section.

The curved plates 11, 12 and 13 are generally quadrilateral in shape and said plates are welded to form the complete tank by any conventional welding method. As shown, the tank may rest directly on the ground or on any other suitable support, and since the bottom of the tank is dished the ground or other support is recessed to receive the same. Considering the portion of the tank above the ground level, the same comprises two spherical sections formed by the plates 11 and 12 respectively. The upper section 21 is approximately semi-spherical in shape and the lower section 22 is also a part of a sphere. The two sections are in superposed relation and the radius of curvature of each section, as shown in Figure 1, is different, with RB being greater than RA.

The bottom girder takes the horizontal component of the forces from the shell and bottom plates, and since the girder remains in a true circular horizontal form it eliminates any uplift.

In the modification of the invention shown in Figure 5 the tank is the same as Figure 1 with the exception that the upper and lower sections unite in a manner to form an exterior angle greater than 180 degrees. The tank is designated in its entirety by numeral 40, having an approximately spherical shape and comprising a plurality of curved plates 41 and 42 suitably welded to each other to form the portion of the tank above ground level. Metal plates 43, also having a curved formation, are assembled to form the bottom portion 44 of the tank, which is located below the ground level. At said ground level the circular girder 45 functions to securely unite the dished bottom member to the upper portion of the tank. Also said girder strengthens the tank and reinforces the same in the vicinity of the junction of the upper portion with the base against bursting, collapsing and uplifting pressures due to the liquid contained in the tank and the vapors generated thereby. The construction of the girder 45 is substantially as shown in connection with the tank of Figure 1.

Numeral 46 indicates the top semi-spherical section of the tank formed by the curved plates 41 and which has a radius of curvature RA. This top section is in superposed relation with the lower section 47 formed by the curved plates 42 and which is also a part of a sphere. Whereas, in Figure 1 the lower section had a larger radius than the top section to form an angle of less than 180 degrees at the intersection of said radii, this modified tank of Figure 5 is substantially the reverse. In other words, the radii RA and RB are more nearly equal and the junction where they intersect provides an exterior angle greater than 180 degrees. This junction of plates 41 with plates 42 is adequately reinforced by the interior horizontally disposed girder identified by numeral 48. Said girder includes the ring or circular member 50, the horizontal member 51, and the gusset plates 52. These three parts are assembled to form an interior girder in much the same manner as they are employed in Figure 1 to form an exterior girder at the ground lever.

The dished bottom part 44 of the tank shown in Figure 5 has a radius of curvature indicated by RC and is relatively large to provide the tank with a bottom of large diameter. This modified form of tank is also a solid of revolution about a central vertical axis and therefore any vertical cross section on this center line will have the same contour and the same area as shown in Figure 5. The sections are disposed one on the other and in accordance with the invention the center of the top semi-spherical section does not coincide with the center of the lower spherical section.

Figure 6 discloses a further modification of the present invention wherein tank 60 is formed of curved plates 61, 62 and 63. The plates 61 form the upper spherical section of the tank indicated by numeral 66 and which has superposed relation with the lower section 67 formed by the plates 62. At the ground level the tank is suitably reinforced by the girder 65 which is located exteriorly of the tank at the junction of the upper portion thereof with the dished bottom member 64. Also the junction of the top section with the bottom section is reinforced in a manner as above described by means of the girder 68 having gusset plates 69 and this junction is characterized by an exterior angle of less than 180 degrees.

In this modification the upper spherical section instead of having one radius of curvature is characterized by a plurality of different radii. More particularly, certain plates 61 of this section have a radius of curvature in a longitudinal direction as indicated by RA and other of said plates have a longitudinal curvature conforming to the shorter radius RD. The lower spherical section of this tank 67 has certain of the plates 62 curved to conform to the radius RB, whereas, other plates have a longitudinal curvature conforming to a shorter radius RE. The exterior surfaces of the sections can be constructed using two or more radii.

The dished bottom member 64 provides a base of relatively large diameter. The radius of curvature RC for said bottom member is proportioned to make the diameter of the bottom portion less than the diameter of the lower spherical section. This design has the advantage that pressure tanks for storing volatile liquids can be made of larger diameter for the same height with resulting increase in capacity.

In the closed pressure tanks of the invention the top section is characterized by having a shape which is substantially semi-spherical. This applies to the top section 21 in Figure 1, 46 in Figure 5, and 66 in Figure 6. The lower section, namely, 22, 47 and 67 conforms to a part of a sphere but the same is not semi-spherical. Actually the lower section of each tank is a segment of a sphere and in accordance with the invention the center of this spherical segment does not coincide with the center of the semi-spherical top section. Since the centers of the two sections do not coincide the spherical contour of the tank above the dished bottom portion is interrupted at the junction of these sections with each other. Thus, it will be seen that in Figures 1 and 6 an exterior angle of less than 180 degrees is formed at the junction of the sections, while in Figure 5 an exterior angle greater than 180 degrees is formed at the junction of sections 46 and 47.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A closed container of the character described substantially in the shape of a solid of revolution about a central vertical axis, said container including an approximately spherical portion and a dished bottom portion, said first mentioned portion including a top semi-spherical section and a lower section conforming to a median segment of a sphere the center of which does not coincide with the center of the top section, the junction of said sections with each other lying in a horizontal plane and said dished bottom portion also being joined to the tank in a horizontal plane spaced from the first mentioned plane, a girder at the junction of said sections, and a second girder at the junction of the tank with the dished bottom, the junction of the spherical sections with each other forming an exterior angle of less than 180 degrees whereby the spherical contour of the tank above the dished bottom is interrupted at said junction.

2. A pressure container in the shape of a solid of revolution about a central vertical axis, said container comprising an approximately spherical upper portion and a dished bottom portion with both said portions being constructed of a plurality of metal plates welded together, the upper portion including a top semi-spherical section and a lower section conforming to a median segment of a sphere, the junctions of said sections with each other lying in a horizontal plane and said dished bottom portion also being joined to the upper portion in a horizontal plane spaced from the first mentioned plane, a girder at the junction of said sections, the spherical contour of the upper portion above the dished bottom being interrupted at the junction of the spherical sections with each other, and the diameter of the dished bottom portion being less than twice the radius of curvature of the lower section.

3. A pressure container in the shape of a solid of revolution about a central vertical axis, said container comprising an approximately spherical upper portion having location above ground level and a dished bottom portion below ground level, both of said portions being constructed of a plurality of metal plates welded together, the upper portion including a top semi-spherical section and a lower section conforming to a median segment of a sphere and having a radius of curvature greater than that of the top semi-spherical section, the junction of said sections with each other lying in a horizontal plane and said dished bottom portion also being joined to the upper portion in a horizontal plane spaced from the first mentioned plane, a girder at the junction of said sections, a second girder at the junction of the upper portion with the dished bottom, the spherical contour of said upper portion above the dished bottom being interrupted at the junction of the spherical sections with each other, and the diameter of said dished bottom portion being less than twice the radius of curvature of the lower section.

CHARLES L. MARNER.